(12) United States Patent
Sakai et al.

(10) Patent No.: US 8,075,975 B2
(45) Date of Patent: *Dec. 13, 2011

(54) OPTICAL RECORDING MEDIUM AND METHOD FOR MANUFACTURING THE SAME

(75) Inventors: Takemitsu Sakai, Miyagi (JP); Etsuro Ikeda, Miyagi (JP); Yuichi Sabi, Tokyo (JP)

(73) Assignee: Sony Corporation, Tokyo (JP)

( * ) Notice: Subject to any disclaimer, the term of this patent is extended or adjusted under 35 U.S.C. 154(b) by 331 days.

This patent is subject to a terminal disclaimer.

(21) Appl. No.: 12/301,366

(22) PCT Filed: Mar. 21, 2008

(86) PCT No.: PCT/JP2008/055996
§ 371 (c)(1),
(2), (4) Date: Nov. 18, 2008

(87) PCT Pub. No.: WO2008/117858
PCT Pub. Date: Oct. 2, 2008

(65) Prior Publication Data
US 2010/0047503 A1    Feb. 25, 2010

(30) Foreign Application Priority Data
Mar. 23, 2007    (JP) ................. 2007-077962

(51) Int. Cl.
*B32B 3/02*    (2006.01)
(52) U.S. Cl. .................... 428/64.1; 428/64.4; 428/64.5; 428/64.6; 430/270.12

(58) Field of Classification Search ............ 428/64.4, 428/64.5, 64.6
See application file for complete search history.

(56) References Cited

U.S. PATENT DOCUMENTS

| | | | |
|---|---|---|---|
| 7,357,969 B2 * | 4/2008 | Nakai et al. | 428/64.1 |
| 7,468,200 B2 | 12/2008 | Sabi | |
| 2005/0106353 A1 | 5/2005 | Nakai et al. | |
| 2005/0276946 A1 * | 12/2005 | Sabi et al. | 428/64.4 |
| 2008/0233389 A1 * | 9/2008 | Sakai et al. | 428/336 |

FOREIGN PATENT DOCUMENTS

| | | |
|---|---|---|
| EP | 1 683 647 A1 | 7/2006 |
| EP | 1 717 336 A1 | 11/2006 |

(Continued)

OTHER PUBLICATIONS

Japanese Office Action issued on Jan. 26, 2010 in connection with counterpart JP Application No. 2007-077962.

(Continued)

*Primary Examiner* — Elizabeth Mulvaney
(74) *Attorney, Agent, or Firm* — SNR Denton US LLP (57) ABSTRACT

An optical recording medium is an optical recording medium having an inorganic recording film and has a transparent conductive film on the inorganic recording film. The inorganic recording film has a first recording film containing titanium (Ti) and a second recording film containing an oxide of germanium (Ge). The transparent conductive film is provided on the side of the second recording film. The transparent conductive film contains an oxide of tin (Sn).

4 Claims, 5 Drawing Sheets

FOREIGN PATENT DOCUMENTS

| | | | |
|---|---|---|---|
| JP | 64-017234 | | 1/1989 |
| JP | 06-171236 | * | 6/1994 |
| JP | 11-185295 | | 7/1999 |
| JP | 2002-208182 | | 7/2002 |
| JP | 2006-018981 | | 1/2006 |
| JP | 2006-040342 | | 2/2006 |
| JP | 2006-252677 | | 9/2006 |
| JP | 2006-281751 | | 10/2006 |
| JP | 2006-347082 | | 12/2006 |
| JP | 2006-281751 | | 10/2009 |

OTHER PUBLICATIONS

International Search Report dated May 13, 2008.
Japanese Patent Office Action corresponding to Japanese Serial No. 2007-077962 dated Oct. 6, 2009.
European Communication—Summons to Attend Oral Proceedings, dated Jun. 27, 2011 in connection with counterpart EP Application No. 08 739 122.3.

* cited by examiner

OPTICAL RECORDING MEDIUM AND METHOD FOR MANUFACTURING THE SAME

TECHNICAL FIELD

The invention relates to an optical recording medium and a method for manufacturing the same. More particularly, the invention relates to an optical recording medium having an inorganic recording film.

BACKGROUND ART

In recent years, an optical recording medium of a high-density recording in which information of a large volume can be recorded is demanded. For example, to meet the demand, the standard of a Blu-ray Disc (registered trademark: hereinbelow, referred to as BD) has been specified and a high-definition image can be recorded and stored into the optical recording medium. Assuming that a normal reproducing speed of the high-definition is a one-time speed, according to the BD of the recording type, the disc has already coped with the recording of up to a 2-times speed.

For example, as an optical recording medium suitable for a blue laser recording, a medium having an inorganic recording film constructed by a first recording film containing an oxide of germanium (Ge) and a second recording film which is provided adjacently to the first recording film and contains titanium (Ti) has been proposed (for example, refer to JP-A-2006-281751). Such an optical recording medium has a wide power margin and a very high durability although it is formed by a four-layered film and can be applied to the BD or the like. However, it is requested that it copes with a further high linear velocity recording in future.

DISCLOSURE OF INVENTION

To cope with the high linear velocity recording, it is necessary to realize a high recording sensitivity as recording characteristics. However, if the high recording sensitivity is realized by optimizing an oxygen composition and a film thickness of the first recording film containing the germanium (Ge) oxide, a film thickness of the second recording film containing titanium (Ti), and the like, such a problem that a recording power margin is narrowed occurs.

In the case of using the oxide of germanium (Ge) as a recording material, since a recording principle is fundamentally based on a thermal recording, linear velocity dependency of the recording sensitivity has a certain predetermined ratio and the linear velocity dependency of the recording characteristics such as a power margin is small. Therefore, in order to raise the recording sensitivity at the time of the high linear velocity recording, it is effective to raise the recording sensitivity even at a low linear velocity. In order to assure the wide power margin at this time, a method of similarly assuring the wide power margin even at the low linear velocity becomes an index of improving the whole characteristics.

It is, therefore, an object of the invention to provide an optical recording medium which can realize a wide power margin and a method for manufacturing such a medium.

To solve the above problem, according to the first invention of the invention, there is provided an optical recording medium having an inorganic recording film, characterized in that the optical recording medium includes a transparent conductive film adjacent to the inorganic recording film,
wherein the inorganic recording film has
a first recording film containing titanium (Ti) and
a second recording film containing an oxide of germanium (Ge), and
the transparent conductive film is provided on the side of the second recording film.

According to the second invention of the invention, there is provided a manufacturing method of an optical recording medium having an inorganic recording film, characterized by including the steps of:
forming a first recording film containing titanium (Ti);
forming a second recording film which is adjacent to the first recording film and contains an oxide of germanium (Ge); and
forming a transparent conductive film adjacent to the second recording film.

According to the invention, when recoding light is irradiated, oxygen contained in the second recording film is separated and a Ge layer whose oxygen content is large is formed at an interface between the first recording film and the second recording film. That is, the second recording film is separated into two stable layers in which optical constants are different and preservation stability is high. Thus, when reproducing light is irradiated, there is a change between a reflection light amount of a portion where the recoding light is irradiated and a reflection light amount of a portion where the recoding light is not irradiated, so that good signal characteristics are obtained. Physical characteristics of the first recording film hardly change between timing before the recording and timing after the recording but what is called a catalytic operation adapted to promote a reaction at an interface with the second recording film is caused.

As described above, according to the invention, since the transparent conductive film is provided between the inorganic recording film and the dielectric film, the wide power margin can be realized.

BEST MODE FOR CARRYING OUT THE INVENTION

Embodiments of the invention will be described hereinbelow with reference to the drawings.

(1) First Embodiment

Construction of Optical Recording Medium

Figure 1:
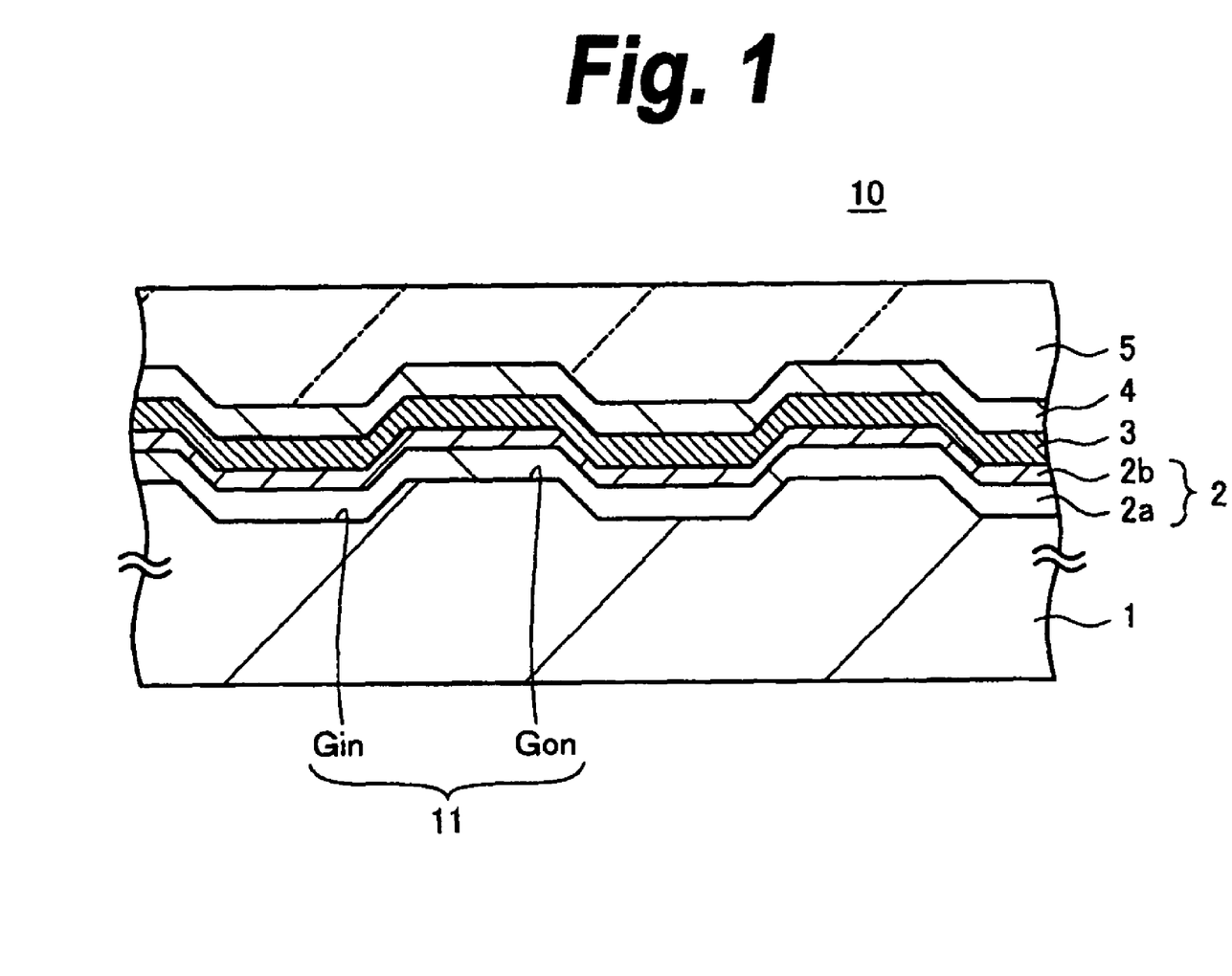
FIG. 1 is a schematic cross sectional view showing a constructional example of an optical recording medium according to the first embodiment of the invention.

FIG. 1 is a schematic cross sectional view showing a constructional example of an optical recording medium according to the first embodiment of the invention. An optical recording medium 10 has a construction in which an inorganic recording film 2, a transparent conductive film 3, a dielectric film 4, and a light transmitting layer 5 are sequentially laminated onto a substrate 1.

In the optical recording medium 10 according to the first embodiment, by irradiating a laser beam from the side of the light transmitting layer 5 onto the inorganic recording film 2, a recording or reproduction of an information signal is performed. For example, the laser beam having a wavelength in a range from 400 nm or more to 410 nm or less is converged by an objective lens having a numerical aperture in a range from 0.84 or more to 0.86 or less and irradiated from the side of the light transmitting layer 5 to the inorganic recording film 2, so that the recording and/or reproduction of the information signal are/is performed. As such an optical recording medium 10, for example, a BD-R can be mentioned.

The substrate 1, inorganic recording film 2, transparent conductive film 3, dielectric film 4, and light transmitting layer 5 constructing the optical recording medium 10 will be sequentially described hereinbelow.

(Substrate)

The substrate 1 has a ring shape in which an opening (hereinbelow, referred to as a center hole) has been formed at the center. One principal plane of the substrate 1 is a concave/convex surface 11. The inorganic recording film 2 is formed on the concave/convex surface 11. Hereinbelow, a concave portion of the concave/convex surface 11 is referred to as an in-groove Gin and a convex portion is referred to as an on-groove Gon.

As shapes of the in-groove Gin and the on-groove Gon, for example, various shapes such as spiral shape, or concentric shape can be mentioned. The in-groove Gin and/or the on-groove Gin is wobbled in order to add address information.

A diameter of substrate 1 is selected to, for example, 120 mm. A thickness of substrate 1 is selected in consideration of a rigidity, preferably, from 0.3 mm to 1.3 mm, more preferably from 0.6 mm to 1.3 mm, and is selected to, for example, 1.1 mm. In addition, a diameter of center hole is selected to, for example, 15 mm.

As a material of the substrate 1, for example, a plastic material or glass can be used. It is preferable to use the plastic material from a viewpoint of costs. As aplastic material, for example, a polycarbonate type resin, polyolefin type resin, acrylic type resin, or the like can be used.

(Inorganic Recording Film)

The inorganic recording film 2 is constructed by a first recording film 2a and a second recording film 2b which is sequentially laminated onto the concave/convex surface 11 of the substrate 1. The first recording film 2a is provided on the side of the concave/convex surface 11 of the substrate 1. The second recording film 2b is provided on the side of the transparent conductive film 3.

The first recording film 2a contains titanium (Ti) as a main component. In addition, it is preferable that the first recording film 2a contains a metal of a low thermal conductivity, as an additive, such as manganese (Mn), zirconium (Zr), or hafnium (Hf) from a viewpoint of improvement of a power margin. A content of metal of the low thermal conductivity lies within a range, preferably, from 1 to 40 atom %, more preferably, from 2 to 30 atom %, and still more preferably, from 5 to 28 atom % from a viewpoint of improvement of the power margin. It is also preferable that the first recording film 2a contains a small quantity of nitrogen (N) from a viewpoint of adjustment of the recording sensitivity. A thickness of first recording film 2a lies within a range, preferably, from 10 to 50 nm.

The second recording film 2b contains an oxide of germanium (Ge) as a main component. A content of oxide of germanium (Ge) in the second recording film 2b lies within a range, preferably, from 88 to 97 atom %, more preferably, from 90 to 97 atom %, and still more preferably, from 90 to 95 atom %. It is also preferable that the second recording film 2b contains tin (Sn) as an additive from a viewpoint of improvement of a durability. A content of tin (Sn) in the second recording film 2b lies within a range, preferably, from 3 to 12 atom %, more preferably, from 3 to 10 atom %, and still more preferably, from 5 to 10 atom %. This is because if the content of tin (Sn) is equal to or larger than 3 atom %, the excellent durability can be obtained and if it is equal to or less than 12 atom %, the excellent signal characteristics can be obtained. In addition, if the first recording film 2a contains titanium (Ti) as a main component and the second recording film 2b contains the oxide of germanium (Ge) as a main component, generally, the good recording characteristics can be obtained.

An absorption coefficient k of the second recording film 2b lies within a range, preferably, from 0.15 or more to 0.90 or less, more preferably, from 0.20 or more to 0.70 or less, and still more preferably, from 0.25 or more to 0.60 or less from a viewpoint of improvement of a modulation degree and a carrier-to-noise ratio (hereinbelow, referred to as a C/N ratio), and the like. Further, a thickness of second recording film 2b lies within a range, preferably, from 10 to 35 nm.

In addition, the absorption coefficient k in the specification is a value measured at the wavelength of 410 nm. The absorption coefficient k can be obtained as follows by using an ellipsometer (made by Rudolph Co., Ltd., trade name: Auto EL-462P17). A phase angle $\Delta$ of elliptic polarization and a tangent $\psi$ which is obtained from an amplitude/intensity ratio of an ellipse are measured by the ellipsometer. A complex index of refraction N and the absorption coefficient k are obtained from the film thicknesses obtained by a surface profiler (made by Tencor Co., Ltd., trade name: P15). In addition, the above operation is performed by using a method of least squares or the like in analyzing software attached to the commercially available ellipsometer.

(Transparent Conductive Film)

The transparent conductive film 3 is provided adjacently to the second recording film 2b. It is preferable that the transparent conductive film 3 contains at least one kind of $SnO_2$ and $In_2O_3$ as a main component. Further, a thickness of transparent conductive film 3 lies within a range, preferably, from 1 to 5 nm. If the film thickness is equal to or larger than 1 nm, the power margin can be widened. If the film thickness is equal to or less than 5 nm, the excellent recording sensitivity can be obtained.

(Dielectric Film)

The dielectric film 4 is provided adjacently to the transparent conductive film 3 and is used to make an optical and mechanical protection of the inorganic recording film 2, that is, an improvement of the durability, a suppression of a deformation, that is, swell of the inorganic recording film 2 upon recording, and the like. As a material of the dielectric film 4, for example, SiN, ZnS—$SiO_2$, AlN, $Al_2O_3$, $SiO_2$, $SiO_2$—$Cr_2O_3$—$ZrO_2$ (hereinbelow, referred to as SCZ), or the like can be used. It is preferable to use ZnS—$SiO_2$. This is because the S/N ratio of the recording signal can be improved and the good signal characteristics can be obtained. It is preferable that a thickness of dielectric film 4 lies within a range from 10 to 100 nm.

(Light Transmitting Layer)

The light transmitting layer 5 is a light transmitting layer 5 of, for example, a resin coating type or a sheet adhering type. The resin coating type adhering layer 4 herein indicates the light transmitting layer 5 formed by a resin coating method. The sheet adhering type light transmitting layer 5 indicates the light transmitting layer 5 formed by a sheet adhering method. The resin coating method and the sheet adhering method will be described herein after.

A thickness of light transmitting layer 5 is selected from a range, preferably, from 10 to 177 μm and is selected to, for example, 100 μm. The high-density recording can be realized by combining such a thin light transmitting layer 5 and the objective lens having a high NA (numerical aperture) of, for example, about 0.85. A bore (diameter) of the light transmitting layer 5 is selected to, for example, 22.7 mm.

The light transmitting layer 5 of the resin coating type is a resin cover formed by hardening a photosensitive resin such as a UV resin. The light transmitting layer of the sheet adhering type is formed by: for example, a light transmitting sheet (film) having a ring shape; and an adhesive layer for adhering the light transmitting sheet to the substrate 1. The adhesive layer is made of, for example, a UV resin or a Pressure Sensitive Adhesive (PSA, hereinbelow, referred to as PSA).

It is preferable that the light transmitting sheet and resin cover are made of a material whose absorbing performance to the laser beam which is used for recording and reproducing is low. Specifically, it is preferable that they are made of a material whose transmissivity is equal to 90% or more. As a material of the light transmitting sheet, for example, a polycarbonate resin, a polyolefin type resin (for example, ZEONEX (registered trademark)), or the like can be mentioned. As a material of the resin cover, for example, an acrylic type resin of an ultra violet hardening type can be mentioned. Further, a thickness of light transmitting sheet is selected to preferably, 0.3 mm or less, and is selected, more preferably, from a range from 3 to 177 μm.

As mentioned above, in the optical recording medium 10 in which the first recording film 2a containing titanium (Ti) and the second recording film 2b containing the oxide of germanium (Ge) are provided as the inorganic recording film 2, a point that the second recording film 2b is separated into the two layers whose oxygen contents are different upon recording is a mechanism of the recording. Since the first recording film 2a and the second recording film 2b are neighboring, such a separation of the second recording film 2b occurs. In the oxygen separation, the surface of the first recording film 2a bears an important role. It is considered that such a phenomenon that the Ti oxide on the surface of the first recording film 2a absorbs blue light or the like serving as recording light and the photocatalyst effect is caused is a recording principle. Such a recording principle is indirectly and actually proved because there were obtained such an experiment result that in the case where an alloy in which a material that does not contain titanium (Ti), for example, aluminum (Al) or silver (Ag) is used as a main component is used or an inert insulative dielectric film such as SiN, or ZnS—SiO$_2$ of a few nm is formed between the first recording film 2a and the second recording film 2b, the second recording film 2b is not clearly separated and a modulation degree decreases remarkably.

Moreover, since such a recording mechanism is used, an influence which is exerted on the separation of germanium (Ge) and oxygen (O) by the addition of the additive to the second recording film 2b is large. In addition, since the photocatalyst effect changes due to the addition of the additive to the first recording film 2a, an influence which is exerted on the recording characteristics by the addition of the additive to the first recording film 2a is large. Further, by forming the transparent conductive film 3 adjacently to one of principal planes of the second recording film 2b, an influence is caused on the recording characteristics such as a power margin.

Manufacturing Method of Optical Recording Medium

Subsequently, a manufacturing method of an optical recording medium according to the first embodiment of the invention will be described.

(Molding Step of Substrate)

First, the substrate 1 in which the concave/convex surface 11 has been formed on one principal plane is molded. As a method of molding the substrate 1, for example, an injection molding (injection) method, a photopolymer method (2P method: Photo Polymerization), or the like can be used.

(Film Forming Step of First Recording Film)

Subsequently, the substrate 1 is conveyed into a vacuum chamber having a target made of, for example, titanium (Ti) as a main component and the inside of the vacuum chamber is vacuumed until its pressure becomes a predetermined pressure. After that, while introducing a process gas into the vacuum chamber, the target is sputtered and the first recording film 2a is formed onto the substrate 1.

An example of film forming conditions in the film forming step is shown below.

Ultimate vacuum: $5.0 \times 10^{-5}$ Pa
Atmosphere: 0.1 to 0.6 Pa
Applied electric power: 1 to 3 kW
Gas kind: Ar gas and N$_2$ gas
Ar gas flow rate: 10 to 40 sccm
N$_2$ gas flow rate: 1 to 10 sccm (Film Forming Step of Second Recording Film)

Subsequently, the substrate 1 is conveyed into the vacuum chamber having a target made of, for example, germanium (Ge) as a main component and the inside of the vacuum chamber is vacuumed until its pressure becomes the predetermined pressure. After that, while introducing the process gas into the vacuum chamber, the target is sputtered and the second recording film 2b is formed onto the first recording film 2a.

An example of film forming conditions in the film forming step is shown below.

Ultimate vacuum: $5.0 \times 10^{-5}$ Pa
Atmosphere: 0.1 to 0.6 Pa
Applied electric power: 1 to 3 kW
Gas kind: Ar gas and O$_2$ gas
Ar gas flow rate: 24 sccm
O$_2$ gas flow rate: 9 sccm (Film Forming Step of Transparent Conductive Film)

Subsequently, the substrate 1 is conveyed into the vacuum chamber having a target made of, for example, at least one kind of SnO$_2$ and InO$_2$ as a main component and the inside of the vacuum chamber is vacuumed until its pressure becomes the predetermined pressure. After that, while introducing the process gas into the vacuum chamber, the target is sputtered and the transparent conductive film 3 is formed onto the second recording film 2b.

An example of film forming conditions in the film forming step is shown below.

Ultimate vacuum: $5.0 \times 10^{-5}$ Pa
Atmosphere: 0.1 to 0.6 Pa
Applied electric power: 1 to 3 kW
Gas kind: Ar gas
Ar gas flow rate: 24 sccm (Film Forming Step of Dielectric Film)

Subsequently, the substrate 1 is conveyed into the vacuum chamber having a target made of, for example, ZnS—SiO$_2$ and the inside of the vacuum chamber is vacuumed until its pressure becomes the predetermined pressure. After that, while introducing the process gas into the vacuum chamber, the target is sputtered and the dielectric film 4 is formed onto the transparent conductive film 3.

An example of film forming conditions in the film forming step is shown below.

Ultimate vacuum: 5.0×10$^{-5}$ Pa
Atmosphere: 0.1 to 0.6 Pa
Applied electric power: 1 to 4 kW
Gas kind: Ar gas
Ar gas flow rate: 6 sccm (Film Forming Step of Light Transmitting Layer)

Subsequently, the light transmitting layer 5 is formed onto the dielectric film 4. As a forming method of the light transmitting layer 5, for example, a resin coating method, a sheet adhering method, or the like can be used. The resin coating method is preferable from a viewpoint of reduction of costs. According to the resin coating method, a photosensitive resin such as a UV resin is spin-coated onto the dielectric film 4 and light such as UV light is irradiated to the photosensitive resin, thereby forming the light transmitting layer 5 as a resin cover. According to the sheet adhering method, a light transmitting sheet is adhered onto the side of the concave/convex surface 11 on the substrate 1 by using an adhesive, thereby forming the light transmitting layer 5.

Further, as a sheet adhering method, for example, a sheet resin adhering method, a sheet PSA adhering method, or the like can be used. According to the sheet resin adhering method, a light transmitting sheet is adhered onto the side of the concave/convex surface 11 on the substrate 1 by using the photosensitive resin such as a UV resin coated on the dielectric film 4, thereby forming the light transmitting layer 5. According to the sheet PSA adhering method, a light transmitting sheet is adhered onto the side of the concave/convex surface 11 on the substrate 1 by using the Pressure Sensitive Adhesive (PSA) which has previously and uniformly coated on one principal plane of the sheet, thereby forming the light transmitting layer 5.

By the above steps, the optical recording medium 10 shown in FIG. 1 is obtained.

As described above, according to the first embodiment of the invention, since the transparent conductive film 3 is provided between the inorganic recording film 2 and the dielectric film 4, the recording characteristics such as a power margin can be improved by using three to five film layers in total. Further, by properly adjusting the film thicknesses or additive, the fundamental recording/reproducing characteristics such as power margin, amplitude of 2 T, and reflectance can be optimized in a range from the low linear velocity recording to the high linear velocity recording.

Moreover, since the optical recording medium 10 can be formed merely by sequentially laminating the first recording film 2a, second recording film 2b, transparent conductive film 3, dielectric film 4, and light transmitting layer 5 onto the substrate 1, the optical recording medium 10 of the high-recording density having the simple film structure can be realized. That is, the reasonable optical recording medium 10 of the high-recording density can be provided.

(2) Second Embodiment

Figure 2:
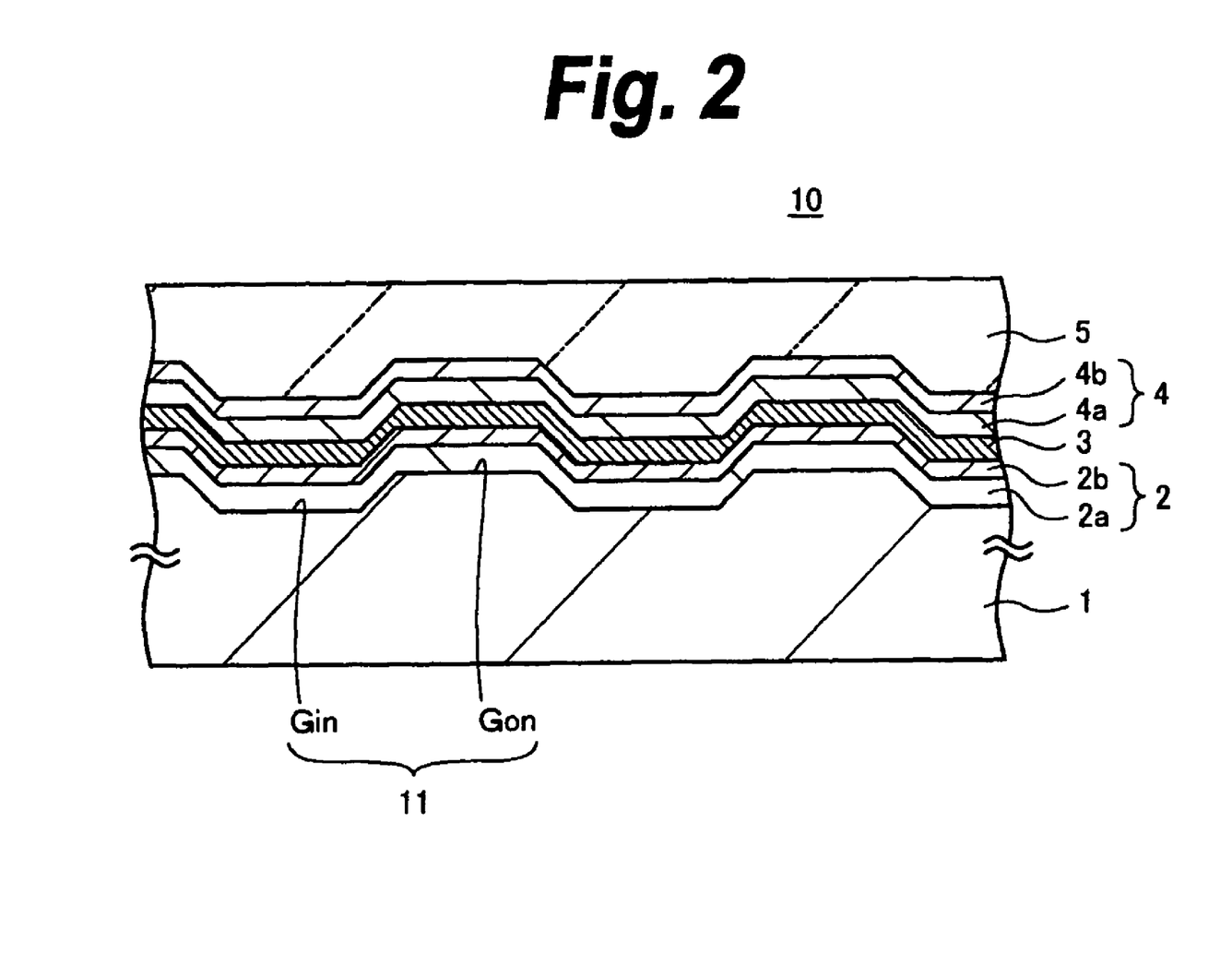
FIG. 2 is a schematic cross sectional view showing a constructional example of an optical recording medium according to the second embodiment of the invention.

FIG. 2 is a schematic cross sectional view showing a constructional example of an optical recording medium according to the second embodiment of the invention. According to the second embodiment, the dielectric film 4 is formed by a first dielectric film 4a and a second dielectric film 4b in the foregoing first embodiment. Portions similar to those in the foregoing first embodiment are designated by the same reference numerals and their description is omitted.

The first dielectric film 4a is provided on the side of the transparent conductive film 3. The second dielectric film 4b is provided on the side of the light transmitting layer 5. The first dielectric film 4a and second dielectric film 4b are made of, for example, dielectric materials of different materials and/or compositions.

As a material of the first dielectric film 4a, it is preferable to use ZnS—SiO$_2$ from a viewpoint of a film forming speed or the like. A film thickness of first dielectric film 4a is, for example, 10 to 100 nm. As a material of the second dielectric film 4b, it is preferable to use a stable dielectric material such as SiN, or SCZ. By using such a stable dielectric material, in the case of using the adhering type as the light transmitting layer 5, such a phenomenon that a component such as sulfur (S) contained in the first dielectric film 4a reacts on the PSA or the like in the light transmitting layer 5, the light transmitting layer 5 deteriorates, and the durability deteriorates can be suppressed. Further, in the case of using the resin coating type as the light transmitting layer 5, a deterioration in durability due to contraction at the time of the resin hardening can be suppressed. A thickness of second dielectric film 4b is, for example, 1 to 10 nm.

Subsequently, an example of a manufacturing method of an optical recording medium according to the second embodiment of the invention will be described. The manufacturing method of the optical recording medium has film forming steps of the first dielectric film and the second dielectric film in place of the film forming step of the dielectric film in the foregoing first embodiment.

An example of film forming conditions of the first dielectric film and the second dielectric film is shown below.

(Film Forming Step of First Dielectric Film)

The substrate 1 is conveyed into the vacuum chamber having a target made of, for example, ZnS—SiO$_2$ and the inside of the vacuum chamber is vacuumed until its pressure becomes the predetermined pressure. After that, while introducing the process gas into the vacuum chamber, the target is sputtered and the first dielectric film 4a is formed onto the transparent conductive film 3.

An example of film forming conditions in the film forming step is shown below.

Ultimate vacuum: 5.0×10$^{-5}$ Pa
Atmosphere: 0.1 to 0.6 Pa
Applied electric power: 1 to 4 kW
Gas kind: Ar gas
Ar gas flow rate: 6 sccm (Film Forming Step of Second Dielectric Film)

Subsequently, the substrate 1 is conveyed into the vacuum chamber having a target made of, for example, SCZ and the inside of the vacuum chamber is vacuumed until its pressure becomes the predetermined pressure. After that, while introducing the process gas into the vacuum chamber, the target is sputtered and the second dielectric film 4b is formed onto the first dielectric film 4a.

An example of film forming conditions in the film forming step is shown below.

Ultimate vacuum: 5.0×10$^{-5}$ Pa
Atmosphere: 0.1 to 0.6 Pa
Applied electric power: 1 to 3 kW
Gas kind: Ar gas
Ar gas flow rate: 15 sccm As mentioned above, according to the second embodiment of the invention, since the transparent conductive film 3 is provided between the inorganic recording film 2 and the dielectric film 4 and the dielectric film 4 is constructed by the first dielectric film 4a and the second dielectric film 4b, the durability can be further improved as compared with that in the first embodiment.

Although the invention will be specifically described by Examples hereinbelow, the invention is not limited only by those Examples. In addition, in the following Examples, portions corresponding to the foregoing embodiments are designated by the same reference numerals.

The optical recording medium 10 in the Examples is an optical recording medium designed in correspondence to an optical system of the BD, specifically, it is an optical recording medium designed in accordance with an optical disc recording and reproducing apparatus using a 2-group objective lens having a numerical aperture of 0.85 and a blue-violet semiconductor laser light source having a wavelength of 405 nm.

In the Examples, as an evaluating apparatus of the optical recording medium, a BD disc inspector (made by Pulstec Industrial Co., Ltd., trade name: ODU-1000) was used. A wavelength of light source was set to 405.2 nm. A linear velocity upon recording was set to 19.67 m/sec (4-times speed: 4×) or 9.83 m/sec (2-times speed: 2×). A linear velocity upon reproduction was set to 4.92 m/sec (1-time speed: 1×) and a channel bit length was set to 74.50 nm (recording density of 25 GB in the optical disc having a diameter of 12 cm). A modulating system was set to 17 PP. A mark length of a 2 T mark as a shortest mark was set to 0.149 µm, a mark length of an 8 T mark was set to 0.596 µm, and a track pitch was set to 0.32 µm.

A jitter measurement was performed by using a time interval analyzer "TA720" made by Yokogawa Electric Corporation through an equalizer board made by Pulstec Industrial Co., Ltd. The equalizer conformed with the standard and the jitter of the signal obtained after passing through a limit equalizer was measured.

As for a measurement of a recording sensitivity Pwo, a power was swept from a lower power to a high power side and a center of recording power values on an over-power side and an under-power side which could be permitted by the system was assumed to be Pwo. There are several regular methods of measuring the power margin. In the Examples, a range where the jitter value obtained after the signal passed through the limit equalizer is equal to or less than 8.5% is set to a margin of the recording sensitivity and a value obtained by dividing the power range by the optimum power is defined as a power margin.

In addition, in order to measure an amplitude, a modulation degree, and the like, a digital oscilloscope "TDS7104" made by Tektronix Inc. was used.

The absorption coefficient k in the Examples was obtained as follows by using an ellipsometer (made by Rudolph Co., Ltd., trade name: Auto EL-462P17). The phase angle $\Delta$ of the elliptic polarization and the tangent $\psi$ which was obtained from the amplitude/intensity ratio of the ellipse were measured by the ellipsometer. The complex index of refraction N and the absorption coefficient k were obtained from the film thicknesses obtained by the surface profiler (made by Tencor Co., Ltd., trade name: P15). In addition, the absorption coefficient k is a value obtained at the wavelength of 410 nm.

Examples 1-1 to 1-6

Comparison 1-1

In Examples 1-1 to 1-6 and Comparison 1-1, by providing the transparent conductive films 3 having different film thicknesses between the inorganic recording film 2 and the dielectric film 4, the optical recording medium 10 was manufactured and its characteristics were evaluated.

First, the polycarbonate substrate (hereinbelow, referred to as a PC substrate) 1 having a thickness of 1.1 mm was manufactured by injection molding. In addition, the concave/convex surface 11 having the in-groove Gin and the on-groove Gon was formed on the PC substrate 1. A depth of in-groove Gin was set to 20 nm and a track pitch was set to 0.32 µm.

Subsequently, the TiMnN film 2a having a thickness of 22 nm, the Ge oxide film 2b having a thickness of 25 nm, the $SnO_2$ film 3 having a thickness of 0 to 6 nm, the $ZnS\textrm{---}SiO_2$ film 4a having a thickness of 52 nm, and the $Si_3N_4$ film 4b having a thickness of 4 nm were sequentially formed on the substrate 1 by using a film forming apparatus (made by Unaxis Co., Ltd., trade name: Sprinter). In addition, the film forming processes were executed without performing an atmospheric exposure. After that, the UV resin was spin-coated onto the $Si_3N_4$ film 4b and hardened by irradiating the UV light, thereby forming the light transmitting layer 5. A thickness of light transmitting layer 5 was set to 100 µm. Thus, the target optical recording medium 10 was obtained.

The specific film forming procedure will be described as follows.

(Film Forming Step of TiMnN Film)

First, after the inside of the vacuum chamber was vacuumed, while introducing an Ar gas and an $N_2$ gas into the vacuum chamber, the TiMn target was sputtered and the TiMnN film 2a having a thickness of 22 nm was formed onto the substrate 1. A content of manganese (Mn) in the TiMn target was set to 20 atom %.

The film forming conditions in the film forming step are shown below.

Ultimate vacuum: $5.0 \times 10^{-5}$ Pa

Atmosphere: 0.2 Pa

Applied electric power: 3 kW

Ar gas flow rate: 30 sccm $N_2$ gas flow rate: 6 sccm (Film Forming Step of Ge Oxide Film)

Subsequently, after the inside of the vacuum chamber was vacuumed, while introducing the Ar gas and an $O_2$ gas into the vacuum chamber, the Ge target was co-sputtered by reactive-sputtering and the Ge oxide film 2b having a thickness of 25 nm was formed onto the TiMnN film 2a. In addition, a content of oxygen (O) in the Ge oxide film 2b was prepared so that the absorption coefficient k was equal to 0.6.

The film forming conditions in the film forming step are shown below.

Ultimate vacuum: $5.0 \times 10^{-5}$ Pa

Atmosphere: 0.2 Pa

Applied electric power: Ge targets (two targets) 0.4 kW

Ar gas flow rate: 30 sccm $O_2$ gas: 30 to 40 sccm (Film forming Step of $SnO_2$ Film)

Subsequently, after the inside of the vacuum chamber was vacuumed, while introducing the Ar gas into the vacuum chamber, the $SnO_2$ target was sputtered and the $SnO_2$ film 3 having a thickness of 0 to 6 nm was formed onto the Ge oxide film 2b.

The film forming conditions in the film forming step are shown below.

Ultimate vacuum: $5.0 \times 10^{-5}$ Pa

Atmosphere: 0.2 Pa

Applied electric power: $SnO_2$ target 0.4 kW

Ar gas flow rate: 10 sccm

In addition, the film thickness was prepared based on the sputtering time.

(Film Forming Step of ZnS—SiO$_2$ Film)

Subsequently, after the inside of the vacuum chamber was vacuumed, while introducing the Ar gas into the vacuum chamber, the ZnS—SiO$_2$ target was sputtered and the ZnS—SiO$_2$ film 4a having a thickness of 52 nm was formed over the Ge oxide film 2b. In addition, a composition ratio (atom ratio) ZnS:SiO$_2$ in the ZnS—SiO$_2$ film 4a was prepared to 80:20.

The film forming conditions in the film forming step are shown below.

Ultimate vacuum: 5.0×10$^{-5}$ Pa
Atmosphere: 0.1 Pa
Applied electric power: 1 kW
Ar gas flow rate: 6 sccm (Film Forming Step of Si$_3$N$_4$ Film)

Subsequently, after the inside of the vacuum chamber was vacuumed, while introducing the Ar gas and the N$_2$ gas into the vacuum chamber, the Si target was sputtered and the Si$_3$N$_4$ film 4b having a thickness of 4 nm was formed over the substrate 1.

The film forming conditions in the film forming step are shown below.

Ultimate vacuum: 5.0×10$^{-5}$ Pa
Atmosphere: 0.3 Pa
Applied electric power: 4 kW
Ar gas flow rate: 50 sccm
N$_2$ gas flow rate: 37 sccm <Evaluation of Power Margin>

Figure 3:
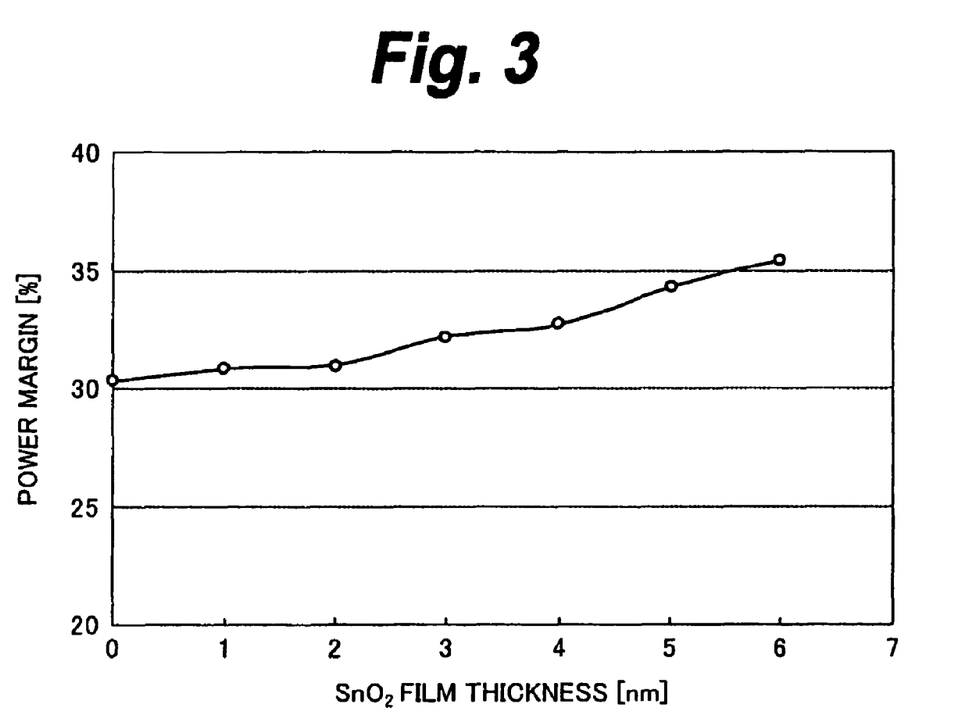
FIG. 3 is a graph showing a relation between an $SnO_2$ film thickness and a power margin in each of Examples 1-1 to 1-6 and Comparison 1-1.

The 4× recording and 1× reproduction were executed to the optical recording medium 10 obtained as mentioned above and the power margins were obtained. Their results are shown in Table 1 and FIG. 3. It will be understood from Table 1 and FIG. 3 that there is such a tendency that the larger the thickness of SnO$_2$ film 3 is, the more the power margin is widened.

<Evaluation of Recording Sensitivity>

Further, the 2× recording and 1× reproduction were executed to the optical recording medium 10 obtained as mentioned above and the recording sensitivities Pwo were obtained. Thus, it has been found that when the thickness of SnO$_2$ film 3 is equal to or less than 5 nm, the recording sensitivity of 7 mW of the 2-times speed (2×) standard can be satisfied.

From the above evaluation results, it is preferable that the transparent conductive film 3 is provided between the inorganic recording film 2 and the dielectric film 4 from a viewpoint of the power margin. It is also preferable that the transparent conductive film 3 is provided between the inorganic recording film 2 and the dielectric film 4 and its film thickness lies within a range from 1 to 5 nm from a viewpoint of the power margin and the recording sensitivity.

TABLE 1

| | SnO$_2$ FILM THICKNESS [nm] | POWER MARGIN [%] |
|---|---|---|
| COMPARISON 1-1 | 0 | 30.3 |
| EXAMPLE 1-1 | 1 | 30.8 |
| EXAMPLE 1-2 | 2 | 31.0 |
| EXAMPLE 1-3 | 3 | 32.2 |
| EXAMPLE 1-4 | 4 | 32.7 |
| EXAMPLE 1-5 | 5 | 34.3 |
| EXAMPLE 1-6 | 6 | 35.4 |

Examples 2-1 to 2-5

Comparison 2-1

In Examples 2-1 to 2-5 and Comparison 2-1, by providing the transparent conductive films 3 having different film thicknesses between the inorganic recording film 2 and the dielectric film 4 and adding tin (Sn) into the second recording film 2b, the optical recording medium 10 was manufactured and its characteristics were evaluated.

The optical recording medium 10 was obtained in a manner similar to those in Comparison 1-1 and Examples 1-1 to 1-5 except that the GeSnO film 2b having a thickness of 25 nm and the SnO$_2$ film 3 having a thickness of 0 to 5 nm were sequentially formed onto the TiMnN film 2a by using a film forming apparatus (made by Unaxis Co., Ltd., trade name: Sprinter).

Film forming steps of the GeSnO film and the SnO$_2$ film will be mentioned below.

(Film Forming Step of GeSnO Film)

After the inside of the vacuum chamber was vacuumed, while introducing the Ar gas and an O$_2$ gas into the vacuum chamber, the Ge target and Sn target were co-sputtered by the reactive-sputtering and the GeOSn film 2b having the thickness of 25 nm was formed onto the TiMnN film 2a. In addition, a content of oxygen (O) in the GeOSn film 2b was prepared so that the absorption coefficient k of the GeOSn film 2b was equal to 0.67. Further, compositions of the GeOSn film 2b were prepared so that a content of tin (Sn) in the GeOSn film 2b was equal to 10 atom % and a content of GeO$_x$ (0<x<2) in the GeOSn film 2b was equal to 90 atom %.

The film forming conditions in the film forming step are shown below.

Ultimate vacuum: 5.0×10$^{-5}$ Pa
Atmosphere: 0.2 Pa
Applied electric power: Ge targets (two targets) 0.4 kW, Sn target 0.1 to 0.5 kW
Ar gas flow rate: 30 sccm
Oxygen gas: 30 to 40 sccm (Film Forming Step of SnO$_2$ Film)

Subsequently, after the inside of the vacuum chamber was vacuumed, while introducing the Ar gas into the vacuum chamber, the SnO$_2$ target was sputtered and the SnO$_2$ film 3 having a thickness of 0 to 5 nm was formed onto the Ge oxide film 2b.

The film forming conditions in the film forming step are shown below.

Ultimate vacuum: 5.0×10$^{-5}$ Pa
Atmosphere: 0.2 Pa
Applied electric power: SnO$_2$ target 0.4 kW
Ar gas flow rate: 10 sccm In addition, the film thickness was prepared based on the sputtering time.

<Evaluation of Power Margin>

Figure 4:
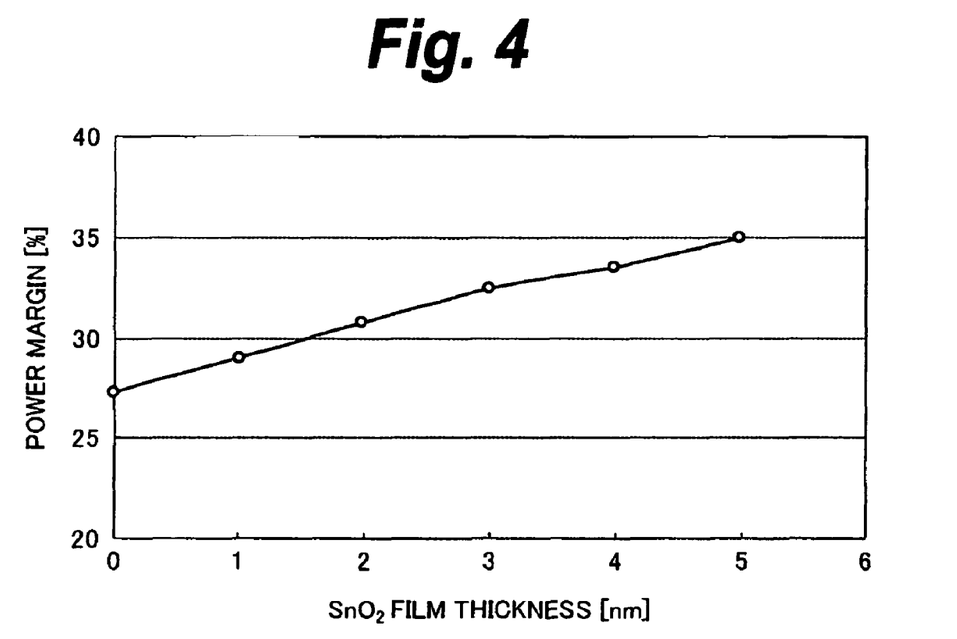
FIG. 4 is a graph showing a relation between an $SnO_2$ film thickness and a power margin in each of Examples 2-1 to 2-5 and Comparison 2-1.

The 4× recording and 1× reproduction were executed to the optical recording medium 10 obtained as mentioned above and the power margins were obtained. Their results are shown in Table 2 and FIG. 4. It will be understood from Table 2 and FIG. 4 that there is such a tendency that the larger the thickness of SnO$_2$ film 3 is, the more the power margin is widened.

<Evaluation of Recording Sensitivity>

The 2× recording and 1× reproduction were executed to the optical recording medium 10 obtained as mentioned above and the recording sensitivities Pwo were obtained. Thus, it has been found that when the thickness of SnO$_2$ film 3 is equal to or less than 5 nm, the recording sensitivity of 7 mW of the 2× standard can be satisfied. Further, the 2× recording and 1× reproduction were executed to the optical recording medium 10 in which the thickness of $SnO_2$ film was equal to or larger than 6 nm and the recording sensitivities Pwo were similarly obtained. Thus, it has been confirmed that when the thickness of $SnO_2$ film is equal to or larger than 6 nm, the recording sensitivity of 7 mW of the 2× standard cannot be satisfied.

<Evaluation of Durability>

Durability tests were executed as follows to the optical recording media 10 of Examples 1-1 to 1-6, Comparison 1-1, Examples 2-1 to 2-5, and Comparison 2-1. First, the optical recording media 10 were held in a thermostat bath for 400 hours at 80° C. and 85% RH (relative humidity). After that, a measurement of SER (Symbol Error Rate) and a microscopic observation were performed. Thus, in Examples 1-1 to 1-6 and Comparison 1-1 in which tin (Sn) was not contained in the second recording film 2b, an increase in SER was large and a number of white points of a size of 10 μm were observed by the microscopic observation. On the other hand, in Examples 2-1 to 2-5 and Comparison 2-1 in which tin (Sn) was contained in the second recording film 2b, no white points were observed by the microscopic observation and the increase in SER was suppressed. Therefore, the addition of tin (Sn) is effective for improvement of the durability.

From the above evaluation results, it is preferable that the transparent conductive film 3 is provided between the inorganic recording film 2 and the dielectric film 4 and tin (Sn) is added to the second recording film 2b from a viewpoint of the power margin and the durability. In addition, it is preferable that the transparent conductive film 3 is provided between the inorganic recording film 2 and the dielectric film 4, its film thickness lies within a range from 1 to 5 nm, and tin (Sn) is added to the second recording film 2b from a viewpoint of the power margin, recording sensitivity, and durability.

TABLE 2

|  | $SnO_2$ FILM THICKNESS [nm] | POWER MARGIN [%] |
|---|---|---|
| COMPARISON 2-1 | 0 | 27.3 |
| EXAMPLE 2-1 | 1 | 28.5 |
| EXAMPLE 2-2 | 2 | 30.8 |
| EXAMPLE 2-3 | 3 | 32.5 |
| EXAMPLE 2-4 | 4 | 33.5 |
| EXAMPLE 2-5 | 5 | 35.0 |

Examples 3-1 to 3-5

Comparison 3-1

In Examples 3-1 to 3-5 and Comparison 3-1, by providing the transparent conductive films 3 having different film thicknesses between the inorganic recording film 2 and the dielectric film 4 and providing the second dielectric film 4b made of SCZ in adjacent to the light transmitting layer 5, the optical recording medium 10 was manufactured and its characteristics were evaluated.

The optical recording medium 10 was obtained in a manner similar to those in Examples 2-1 to 2-5 and Comparison 2-1 except that after the ZnS—$SiO_2$ film 4a was formed by using the film forming apparatus (made by Unaxis Co., Ltd., trade name: Sprinter), the SCZ film 4b having a thickness of 4 nm was formed in place of the $Si_3N_4$ film 4b without performing the atmospheric exposure.

Film forming steps of the SCZ film will be mentioned below.

(Film Forming Step of SCZ Film)

After the inside of the vacuum chamber was vacuumed, while introducing the Ar gas into the vacuum chamber, the SCZ target was sputtered and the SCZ film 4b having the thickness of 4 nm was formed onto the ZnS—$SiO_2$ film 4a.

The film forming conditions in the film forming step are shown below.

Ultimate vacuum: $5.0 \times 10^{-5}$ Pa
Atmosphere: 0.2 Pa
Applied electric power: SCZ target 2.0 kW
Ar gas flow rate: 15 sccm In addition, the film thickness was prepared based on the sputtering time.

<Evaluation of Power Margin>

Figure 5:
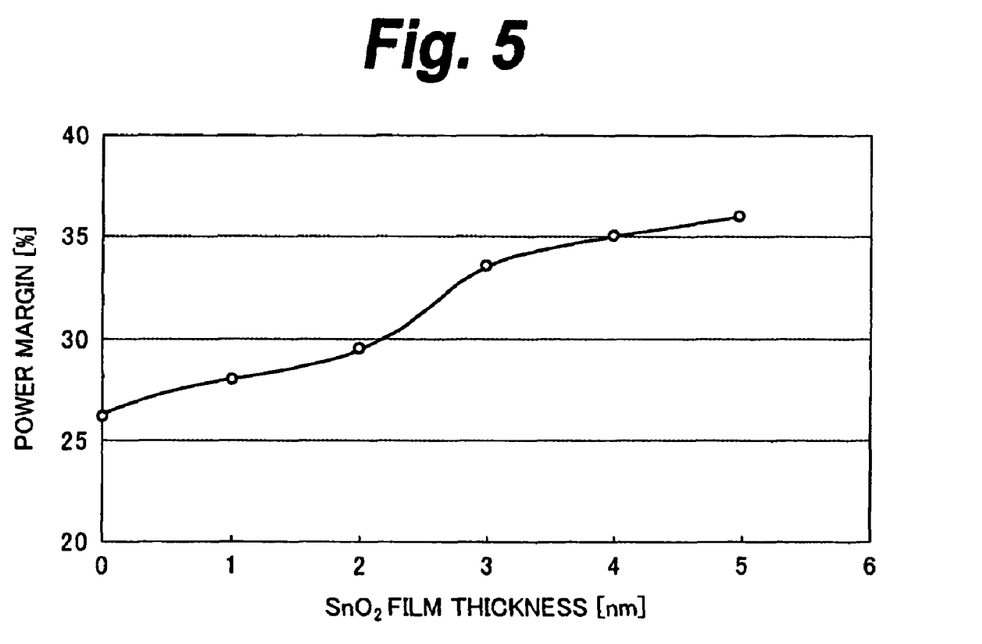
FIG. 5 is a graph showing a relation between an $SnO_2$ film thickness and a power margin in each of Examples 3-1 to 3-5 and Comparison 3-1.

The 4× recording and 1× reproduction were executed to the optical recording medium 10 obtained as mentioned above and the power margins were obtained. Their results are shown in Table 3 and FIG. 5. It will be understood from Table 3 and FIG. 5 that there is such a tendency that the larger the thickness of $SnO_2$ film 3 is, the more the power margin is widened. It will be also understood that an effect almost similar to that in Examples 2 can be obtained irrespective of the kind of dielectric layer 4 provided adjacently to the light transmitting layer 5.

<Evaluation of Recording Sensitivity>

The 2× recording and 1× reproduction were executed to the optical recording medium 10 obtained as mentioned above and the recording sensitivities Pwo were obtained. Thus, it has been found that when the thickness of $SnO_2$ film 3 is equal to or less than 5 nm, the recording sensitivity of 7 mW of the 2× standard can be satisfied. Further, the 2× recording and 1× reproduction were executed to the optical recording medium 10 in which the thickness of $SnO_2$ film was equal to or larger than 6 nm and the recording sensitivities Pwo were similarly obtained. Thus, it has been confirmed that when the thickness of $SnO_2$ film is equal to or larger than 6 nm, the recording sensitivity of 7 mW of the 2× standard cannot be satisfied.

From the above evaluation results, it is preferable that the transparent conductive film 3 is provided between the inorganic recording film 2 and the dielectric film 4 from a viewpoint of the power margin. It is also preferable that the transparent conductive film 3 is provided between the inorganic recording film 2 and the dielectric film 4 and its film thickness is set to be within a range from 1 to 5 nm from a viewpoint of the power margin and the recording sensitivity.

TABLE 3

|  | $SnO_2$ FILM THICKNESS [nm] | POWER MARGIN [%] |
|---|---|---|
| COMPARISON 3-1 | 0 | 26.2 |
| EXAMPLE 3-1 | 1 | 28.0 |
| EXAMPLE 3-2 | 2 | 29.5 |
| EXAMPLE 3-3 | 3 | 33.5 |
| EXAMPLE 3-4 | 4 | 35.0 |
| EXAMPLE 3-5 | 5 | 37.5 |

Although the embodiments and Examples of the invention have specifically been described above, the invention is not limited to the above embodiments and Examples but various kinds of modifications based on the technical ideas of the invention are possible.

For example, the numerical values mentioned in the foregoing embodiments and Examples are nothing but examples and other numerical values different from them may be used as necessary.

Further, the constructions of the foregoing embodiments and Examples can be mutually combined so long as they do not depart from the spirit of the invention.

Furthermore, although the above embodiments and Examples have been described with respect to the example in which the invention is applied to the optical recording medium having the inorganic recording film of the single layer, the invention can be also applied to an optical recording medium having an inorganic recording film of two or more layers.

Furthermore, although the above embodiments and Examples have been described with respect to the case, as an example, where the invention is applied to the optical recording medium which has the light transmitting layer on the inorganic recording film and in which the recording or reproduction of the information signal is executed by irradiating the laser beam from the light transmitting layer side to the inorganic recording film, the invention is not limited to such an example. For instance, the invention can be also applied to an optical recording medium which has an inorganic recording film on a substrate and in which the recording or reproduction of the information signal is executed by irradiating the laser beam from the substrate side to the inorganic recording film or an optical recording medium which is formed by adhering two substrates and the recording or reproduction of the information signal is executed by irradiating the laser beam from the side of one of the substrates to an inorganic recording film between the substrates.

The invention claimed is:

1. An optical recording medium having an inorganic recording film, the optical recording medium comprising:
   a transparent conductive film on the inorganic recording film; and
   a dielectric layer on the transparent conductive film, wherein
   (i) the inorganic recording film has
      (a) a first recording film containing titanium (Ti) and
      (b) a second recording film containing an oxide of germanium (Ge),
   (ii) the transparent conductive film is provided on the side of the second recording film, and
   (iii) a thickness of the transparent conductive film is 1 to 5 nm.

2. The optical recording medium according to claim 1, wherein the transparent conductive film contains at least one kind of an oxide of tin (Sn) and an oxide of indium (In).

3. The optical recording medium according to claim 1, wherein the second recording film further contains tin (Sn).

4. A manufacturing method of an optical recording medium having an inorganic recording film, comprising:
   forming a first recording film containing titanium (Ti);
   forming a second recording film on the first recording film, the second recoding film containing an oxide of germanium (Ge);
   forming a transparent conductive film on the second recording film, the transparent conductive film having a thickness of 1 to 5 nm; and
   forming a dielectric layer on the transparent conductive film.

* * * * *